United States Patent
Hagenbuch et al.

(10) Patent No.: US 9,230,513 B2
(45) Date of Patent: Jan. 5, 2016

(54) APPARATUS, SYSTEM AND METHOD FOR COOPERATIVELY PRESENTING MULTIPLE MEDIA SIGNALS VIA MULTIPLE MEDIA OUTPUTS

(71) Applicant: LENOVO (Singapore) PTE, LTD., New Tech Park (SG)

(72) Inventors: Matthew Lloyd Hagenbuch, Durham, NC (US); Robert A. Bowser, Cary, NC (US); Howard Locker, Cary, NC (US)

(73) Assignee: Lenovo (Singapore) PTE. LTD., Tech Park (SG)

( * ) Notice: Subject to any disclaimer, the term of this patent is extended or adjusted under 35 U.S.C. 154(b) by 0 days.

(21) Appl. No.: 13/840,491

(22) Filed: Mar. 15, 2013

(65) Prior Publication Data

US 2014/0267908 A1  Sep. 18, 2014

(51) Int. Cl.
*H04N 7/01* (2006.01)
*G09G 5/14* (2006.01)
*H04N 5/445* (2011.01)
*H04N 21/431* (2011.01)
*H04N 21/4402* (2011.01)
*G06F 3/14* (2006.01)

(52) U.S. Cl.
CPC .............. *G09G 5/14* (2013.01); *H04N 5/44591* (2013.01); *H04N 21/4314* (2013.01); *H04N 21/440272* (2013.01); *G06F 3/1431* (2013.01); *G06F 3/1438* (2013.01); *G06F 3/1446* (2013.01)

(58) Field of Classification Search
CPC ....................................................... H04N 7/01
USPC .......... 348/552, 553, 441, 725, 563; 707/790, 707/803, 804
See application file for complete search history.

(56) References Cited

U.S. PATENT DOCUMENTS

| | | | |
|---|---|---|---|
| 4,905,163 A * | 2/1990 | Garber et al. ................... 706/55 |
| 7,720,251 B2* | 5/2010 | Allen et al. ..................... 382/100 |
| 2004/0210479 A1* | 10/2004 | Perkowski et al. ............. 705/14 |
| 2005/0018768 A1* | 1/2005 | Mabey et al. ................ 375/240.2 |
| 2005/0052623 A1* | 3/2005 | Hsiung ............................ 353/94 |
| 2007/0055997 A1* | 3/2007 | Witwer ............................ 725/81 |
| 2007/0077978 A1* | 4/2007 | Walker et al. ................... 463/16 |
| 2008/0134258 A1* | 6/2008 | Goose et al. ..................... 725/91 |
| 2008/0244373 A1* | 10/2008 | Morris et al. .................. 715/202 |
| 2010/0115408 A1* | 5/2010 | Mujkic et al. ................. 715/716 |
| 2011/0029576 A1* | 2/2011 | Goldman et al. ............. 707/803 |
| 2011/0231527 A1* | 9/2011 | Herlein ......................... 709/220 |
| 2012/0143730 A1* | 6/2012 | Ansari et al. ................. 705/27.1 |
| 2013/0169863 A1* | 7/2013 | Smith et al. ................... 348/441 |
| 2014/0095335 A1* | 4/2014 | Grosz ........................... 705/26.1 |

* cited by examiner

*Primary Examiner* — Paulos M Natnael
(74) *Attorney, Agent, or Firm* — Kunzler Law Group

(57) ABSTRACT

An apparatus, system, and method are disclosed for cooperatively presenting multiple media signals via multiple presentation devices. Disclosed are apparatuses, systems and methods that integrate portions of multiple media signals and cooperatively present the portions via multiple media output devices.

21 Claims, 11 Drawing Sheets

APPARATUS, SYSTEM AND METHOD FOR COOPERATIVELY PRESENTING MULTIPLE MEDIA SIGNALS VIA MULTIPLE MEDIA OUTPUTS

FIELD

The subject matter disclosed herein relates to managing media signals and more particularly relates to cooperatively presenting multiple media signals via multiple media outputs.

BACKGROUND

Description of the Related Art

Current media presentation devices may provide very high resolution displays and high quality audio. It is expected that the resolution and capabilities of these media output devices will continue to improve. Media generation devices typically do not generate media signals at these higher resolutions and quality levels. Additionally, as resolutions of output devices continues to increase it is less efficient to use a single media signal to occupy the entire resolution or capabilities of a presentation device.

Some presentation devices are capable of presenting a media signal across multiple display devices, however, this functionality does not typically extend to multiple media input signals. For example, executable computer software may span a media signal across multiple output displays.

Some presentation devices are capable of presenting more than one media signal via a single display device. For example, television devices may display two or more signals via picture-in-picture. However, the various configurations or layouts of multiple signals in current presentation devices are limited. Additionally, such presentation devices typically cannot change an aspect ratio of the source media input signal according to the capabilities of the presentation device.

Other devices may accommodate multiple media input signals, but optionally select a single media signal for presentation. For example, a keyboard/video/mouse (KVM) switch, may receive multiple media signals from multiple media generation devices, however a KVM typically can only select one media signal at a time for presentation to a media output device.

BRIEF SUMMARY

Based on the foregoing discussion, the inventors have recognized a need for an apparatus, system, and method that cooperatively presents multiple media signals via multiple media outputs.

Beneficially, such an apparatus, system, and method would receive a plurality of configuration parameters for determining how a plurality of media signals are presented via a plurality of media outputs, receive a plurality of media signals, and integrate portions of more than one of the plurality of media signals dynamically for cooperative presentation via one or more media outputs and based on the configuration parameters.

The embodiments of the present invention have been developed in response to the present state of the art, and in particular, in response to the problems and needs in the art that have not yet been fully solved by currently available media management apparatuses, methods, and systems. Accordingly, the embodiments have been developed to provide a method, apparatus, and system for cooperatively presenting multiple media signals via multiple media outputs that overcome many or all of the above-discussed shortcomings in the art.

The apparatus is provided comprising a media manager configured to functionally execute the necessary steps of: integrating portions of more than one of the media signals for presentation via one or more of the media outputs; cooperatively presenting one of the media signals via more than one of the media outputs, the more than one of the media outputs each presenting different portions of the one of the media signals; and receiving configuration parameters for dynamically adjusting the integrated portions of the media signals and the presented portions of the media signals.

In one embodiment, the apparatus comprises a computer readable storage medium storing machine readable code executed by a processor, the machine readable code comprising an integration module, a transmission module, and a reader module. In one embodiment, the integration module is configured to integrate portions of more than one media signal for presentation via one or more media outputs. In another embodiment, the transmission module is configured to cooperatively transmit integrated media signals to one or more of the media outputs, respective integrated media signals comprising different portions of the more than one media signals. In a further embodiment, the receiver module is configured to receive configuration parameters for dynamically adjusting the integrated portions of the media signals and the transmitted portions of the media signals.

One embodiment includes respective media signals originating from different media devices. In another embodiment, one of the media signals originates at a television device, another one of the media signals originates at a gaming console, wherein the one media signal and the another media signal are integrated into one media output. In one embodiment, the configuration parameters are received via one of a USB connection, an Ethernet connection, a wireless connection, and a connection with a gesture motion sensor. In one embodiment, the dynamically adjusting includes modifying the aspect ratio of one or more media generation devices. In another embodiment, dynamically adjusting includes adding a media signal for integration into one or more of the media outputs.

In a further embodiment, one or more of the received media signals are encrypted. In one embodiment, there is a one-to-one correlation between the media signals and media outputs. In one embodiment, the media signals are transmitted via one of HDMI, DisplayPort, RGB video with dual channel audio, Miracast®, and WiGig® WDE.

A method is also presented for cooperatively presenting multiple media signals via multiple media outputs. The method in the disclosed embodiments substantially includes the steps necessary to carry out the functions presented above with respect to the operation of the described apparatus and system. In one embodiment, the method includes receiving a plurality of configuration parameters for determining how a plurality of media signals are presented via a plurality of media outputs, receiving a plurality of media signals, and integrating portions of more than one of the plurality of media signals dynamically for cooperative presentation via one or more media outputs and based on the configuration parameters. In one embodiment, the receiving includes receiving different media signals from different media devices. In another embodiment, the integrating includes combining a media signal from a television device and a media signal from a gaming console into one media output for side-by-side presentation. In another embodiment, the cooperative presentation includes dividing one of the plurality of media signals into one or more portions, and displaying the one or more portions via the plurality of media outputs, respective one or more portions being displayed on different media outputs.

In a further embodiment, the method further includes receiving another media signal, and dynamically adjusting one or more media outputs to integrate the received another signal via the one or more media outputs. In another embodiment, the adjusting includes overlaying the received another media signal via one of the media outputs and muting an audio portion of another of the one of the plurality of received media signals. In one embodiment, the adjusting includes modifying one or more of the integrated media signals to additionally include the received signal in a format selected from the group: side-by-side, top-bottom, and picture-in-picture. In one embodiment, the method further includes before the adjusting one or more media outputs, receiving additional configuration parameters via communication with a body gesture sensor, wherein the adjusting is based on the additional configuration parameters.

A system is also presented to cooperatively present multiple media signals via multiple media outputs. In one embodiment, the system includes a plurality of media devices for generating a plurality of respective media signals, a plurality of media output devices for cooperatively presenting integrated portions of the media signals, and a media manager.

In one embodiment, the media manager includes an integration module, a transmission module, and a receiver module. In one embodiment, the integration module integrates portions of more than one of the respective media signals to generate one or more integrated media signals. In another embodiment, the transmission module transmits portions of the integrated media signals to respective media outputs. In one embodiment, the receiver module receives configuration parameters to dynamically adjust the integrated portions and the transmitted portions. In one embodiment, the configuration parameters are received from a mobile device. In another embodiment, one of the media signals is partitioned into an audio portion and a video portion, the audio portion being transmitted to an audio output device, the video portion being transmitted to a video output device.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
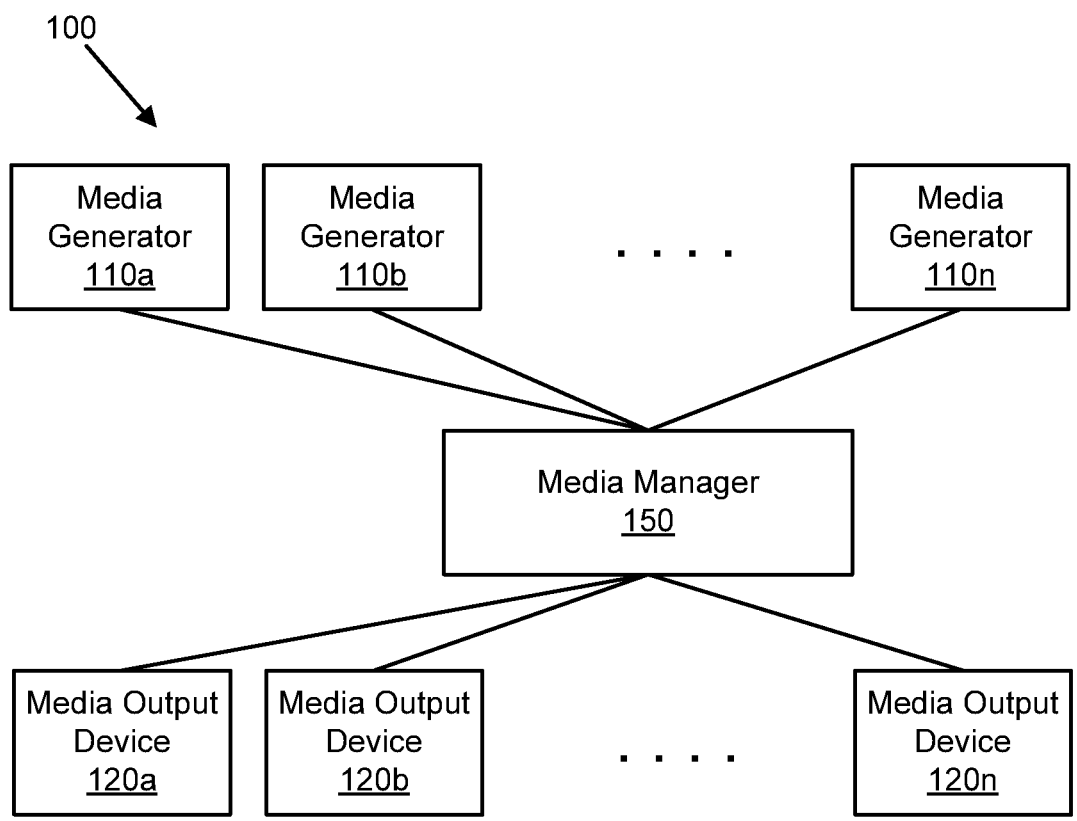
FIG. 1 is a schematic block diagram illustrating one embodiment of a system for cooperatively presenting multiple media signals via multiple media outputs.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Descriptions of Figures may refer to elements described in previous Figures, like numbers referring to like elements.

FIG. 1 depicts one embodiment of a system for cooperatively presenting multiple media signals via multiple media outputs. In this embodiment, multiple media generators 110 may generate respective media signals. The media generators 110 may transmit the media signals to the media manager 150. In one embodiment, the media manager 150 may include multiple media inputs for receiving the respective media signals.

The media signals may be generated by a wide variety of devices as one skilled in the art would appreciate. As described herein, a media generator may generate a media signal. In one embodiment, a media generator is a portable device. For example, a media generator may be a television device, a gaming console, a smart phone, a video camera, an mp3 player, an mp4 player, a personal video player, a DVD player, a digital video recorder, a personal computer, or the like. In this embodiment, a smart phone is a cellular telephone device that is also capable of generating a media signal based, at least in part, on a recorded media signal, a copied media signal from another media generator, or the like. For example, a smart phone may record an audio signal and then generate the recorded audio signal for transmission to a media manager 150.

In one embodiment, a media generator may generate a media signal that is audio. An audio media signal may be in a variety of formats including, but not limited to, waveform audio (WAV), audio interchange file format (AIFF), AU, or pulse-code modulation (PCM), or the like. An audio media signal may be compressed or uncompressed. Compressed audio format may include MP3, Vorbis, Musepack, AAC, ATRAC or Windows® Media Audio (WMA).

In a further embodiment, a media generator may generate a media signal that includes video. A video signal may also be in a variety of formats including, but not limited to, 1080p, 1080i, 24p, 480i, 480p, 576i, 576p, 720p, CCIR, multiplexed analogue components (MAC), Effio, IFrame, interlaced video, IRE, Joint Level Interface Protocol, video cassette recorder (VCR), MovieCD, Naraloop, National Television System Committee (NTSC), Phase Alternating Line (PAL), SECAM, ultra high definition television, video compression format, or other, or to be developed video formats, or the like. A media signal may be a transitory signal and may be transmitted via a physical wire, or transmitted wirelessly.

A media manager 150 may also include a plurality of media outputs 120. The media outputs 120 may receive integrated media signals in a variety of formats previously described.

In one embodiment, the media manager 150 may be capable of integrating portions of the received media signals. The media manager 150 may combine received media signals and transmit the combined signal to a media output device 120a. For example, a media manager 150 may receive two media signals from media generators 110a and 110b, and may combine the two media signals into one integrated media signal. The media manager may then transmit the integrated media signal to a media output device 120a. The combined or integrated media signals may be side-by-side, top-bottom, picture-in-picture, or the like. In another embodiment, the media manager may combine portions of the media signals instead of entire media signals. Further configurations of layouts of media signals and portions of media signals are later described with regard to FIGS. 2-6.

In another embodiment, a media manager 150 may be capable of cooperatively transmitting one of the media signals via more than one of the media outputs 120. For example, the media manager 150 may split a received media signal and transmit the split portions to separate media output devices 120. In one example, the media manager 150 may split a media signal into four quarters and transmit respective quarters to separate media output devices, such as, 120a, 120b, 120c, and 120d, or others. In this way, respective portions of the split media signal may be sent to different media output devices 120 such that each of the media output devices present different portions of the received media signal.

In another embodiment, a media manager 150 may route different media signals to different media output devices 120. For example, the media manager 150 may receive two media signals from two media generators 110, and transmit the two media signals to two different media output devices 120. In this example, the media manager 150 may receive one media signal from a media generator 110a, and transmit the media signal to one media output device 120a, for example. Additionally, the media generator 150 may receive another media signal from another media generator 110b, and transmit the media signal to another media output device 120b, for example. In this way, although this is not necessarily the case, a media manager 150 may be configured to have a one-to-one correlation between media generators 110 and media output devices 120.

In one embodiment, a media manager 150 may receive configuration parameters for dynamically adjusting the integrated portions of the media signals and the presented portions of the media signals. In one embodiment, the configuration parameters are received via physical buttons located on an apparatus that comprises a media manager 150. Additional embodiments of physical buttons are disclosed in regard to FIG. 11.

In another embodiment, the media manager 150 may receive configuration parameters from a wireless device. For example, a remote controller may configure parameters for the media manager 150, by transmitting a signal to the media manager 150. In another example, a mobile device may transmit configuration parameters wirelessly, such as a smart phone, or the like. In another embodiment, the media manager 150 may receive configuration parameters from a computing device. For example, a personal computer may connect to the media manager 150 via a wired connection. As one skilled in the art would appreciate, the configuration parameters may be transmitted using a wide variety of connection technologies, including, but not limited to, Ethernet, USB, FireWire, GPIB, or other, or the like.

In another embodiment, the media manager 150 may receive configuration parameters using gesture recognition. In this embodiment, the media manager 150 may include a configuration input module 830 (FIG. 8) for recognizing physical gestures by a user of the media manager 150. The configuration input module 830 may include depth cameras, stereo cameras, or a single camera, or the like, in order to sense a gesture. In another example, a gesture recognition device may receive gesture input and convert recognized gestures into configuration parameters to be communicated to the media manager 150.

Figure 2:
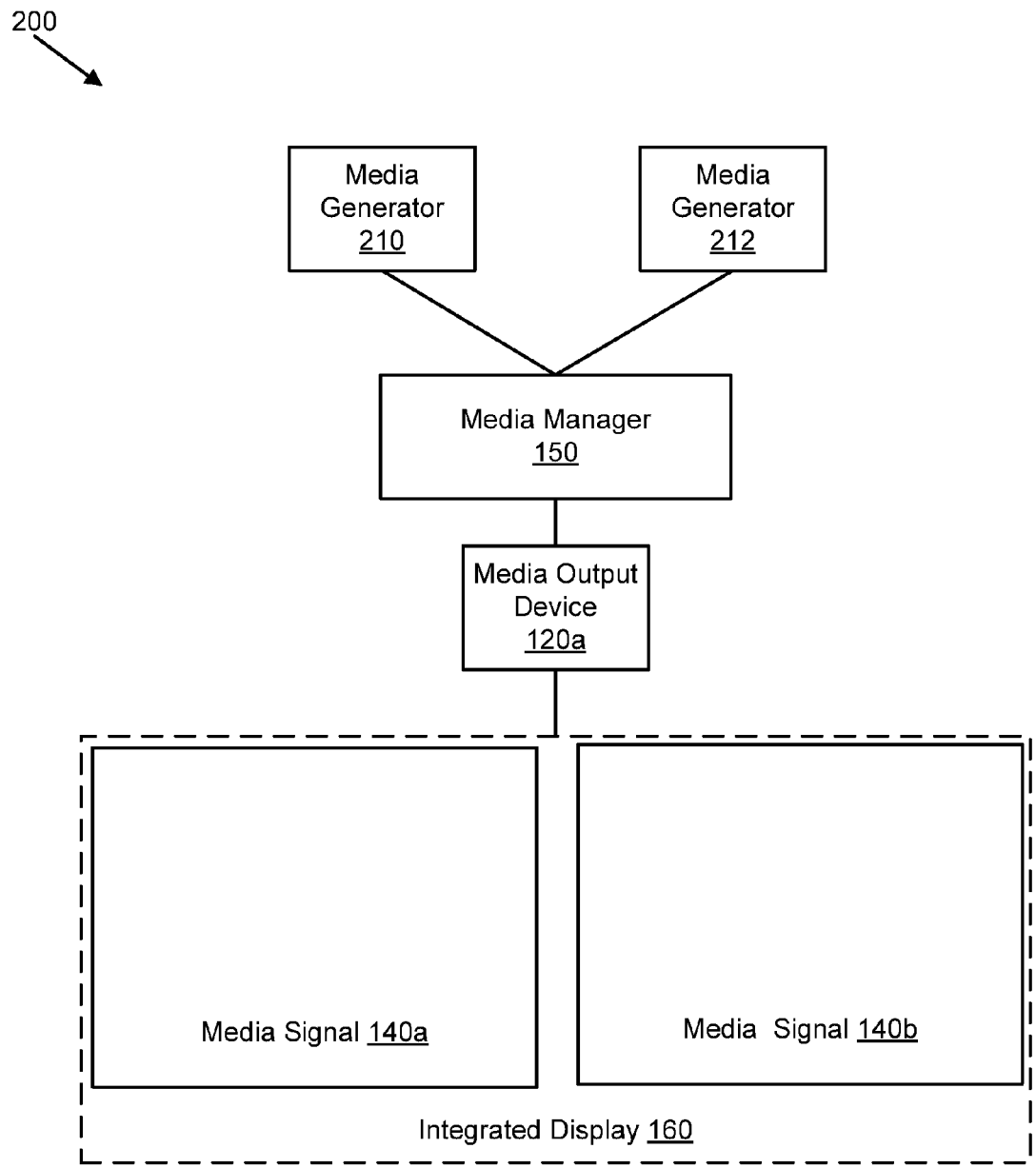
FIG. 2 is a schematic block diagram illustrating one embodiment of a system for cooperatively presenting two media signals via one media output device.

FIG. 2 is a schematic block diagram illustrating one embodiment of a system for cooperatively presenting two media signals 140 via one media output device 120a. In one embodiment, media generators 210,212 generate respective media signals 140 for transmission to a media manager 150 as previously described. In this embodiment, the media manager 150 may integrate the two media signals 140 into one integrated media signal. For example, as previously described, the media manager 150 may integrate the two media signals 140 into one integrated media signal by aligning the two media signals 140 side-by-side.

The integrated media signal may include an audio signal that is a composite audio signal from audio portions of the media signals 140 from the media generators 210,212. For example, the media manager 150 may duplicate the audio portion of the media signal 140a from the media generator 210 and not include the audio portion of the media signal 140b from the media generator 212. In another example, the media manager 150 may duplicate the audio portion of the media signal 140a from the media generator 212 and not integrate the audio portion of the media signal 14b from the media generator 210. In another example, the integrated media signal may include audio signals from both the media generator 210 and the media generator 212. In another example, the integrated media signal may not include an audio portion. In another example, the audio signals may be include sequentially into the integrated media signal.

In one embodiment, the media manager 150 may transmit the integrated media signal to a media output device 120a. The integrated media signal may be transmitted in many ways as previously described or as one skilled in the art would appreciate. The media output device 120a may then display the integrated media signal via one integrated display 160. The integrated display 160 may include an integrated media signal including the media signal 140a and the media signal 140b. In one embodiment, the media signal 140a and the media signal 140b may be integrated side-by-side in the integrated display as disclosed in FIG. 2. In another embodiment, the integrated media signal may be a top-bottom display wherein the media signal 140a is located above the media signal 140b. One skilled in the art will recognize other possible layouts depending on the capabilities on the integrated display 160, such as, but not limited to, display resolution, display format, display aspect ratio, display refresh rate, or the like.

Figure 3:
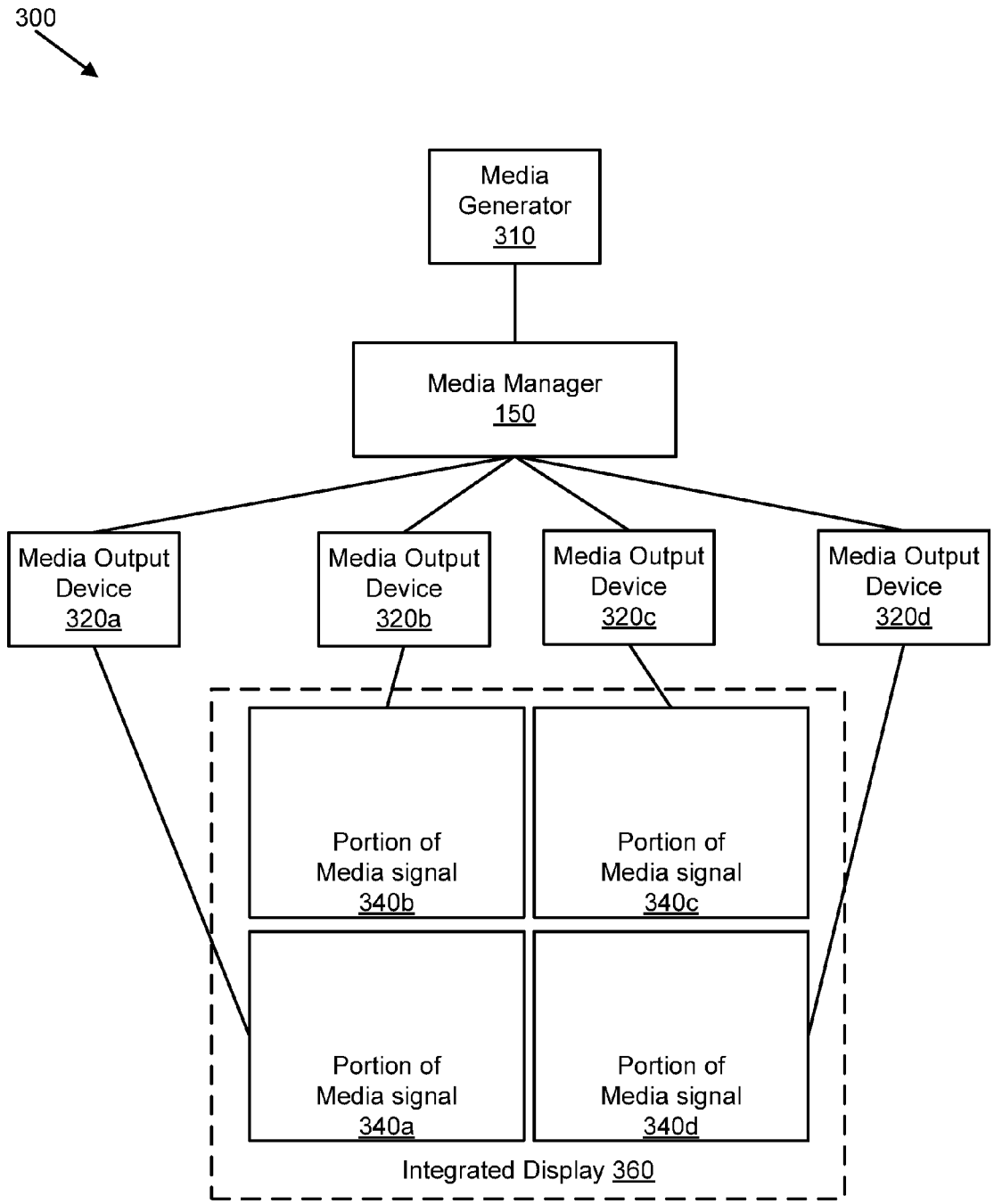
FIG. 3 is a schematic block diagram illustrating one embodiment of a system for cooperatively presenting one media signal via four media outputs.

FIG. 3 is a schematic block diagram illustrating one embodiment of a system for cooperatively presenting one media signal 140 via four media output devices 320. In this embodiment, the media manager 150 may cooperatively present a media signal 340 via more than one of the media outputs 320. Additionally, the media outputs 320 may each present different portions of the media signal 340.

As depicted in FIG. 3, in an embodiment, the media generator 310 may generate a media signal 340 as previously described. The media generator 310 may transmit the media signal 340 to the media manager 150. The media manager 150 may divide the media signal 340 into four portions 340a, 340b, 340c, and 340d. The four portions may or may not be substantially similar in size. The media manager 150 may transmit respective portions of the media signal 340 to media output devices 320. In this embodiment, the media manager 150 may transmit media signal portion 340a to media output device 320a, portion 340b to media output device 320b, portion 340c to media output device 320c, and portion 340d to media output device 320d.

The media output device 320a may display a portion of the media signal 340a at a lower left area of an integrated display 360. The media output device 320b may display a portion of the media signal 340b at an upper left area of an integrated display 360. The media output device 320c may display a portion of the media signal 340c at an upper right area of an integrated display 360. The media output device 320d may display a portion of the media signal 340d at a lower left area of an integrated display. In one embodiment, audio portions of the media signal 340 may be duplicated and transmitted to each media output device 320. In another embodiment, audio portions of the media signal 340 are transmitted to display device 320a, or other. Therefore, the media manager 150 may cooperatively present the media signal 340 via more than one of the media outputs 320. In this embodiment, the media outputs each present different portions of the media signal 340. As described herein, cooperatively presenting means presenting, or causing to be presented, one or more media signals via one or more of the media output devices.

Figure 4:
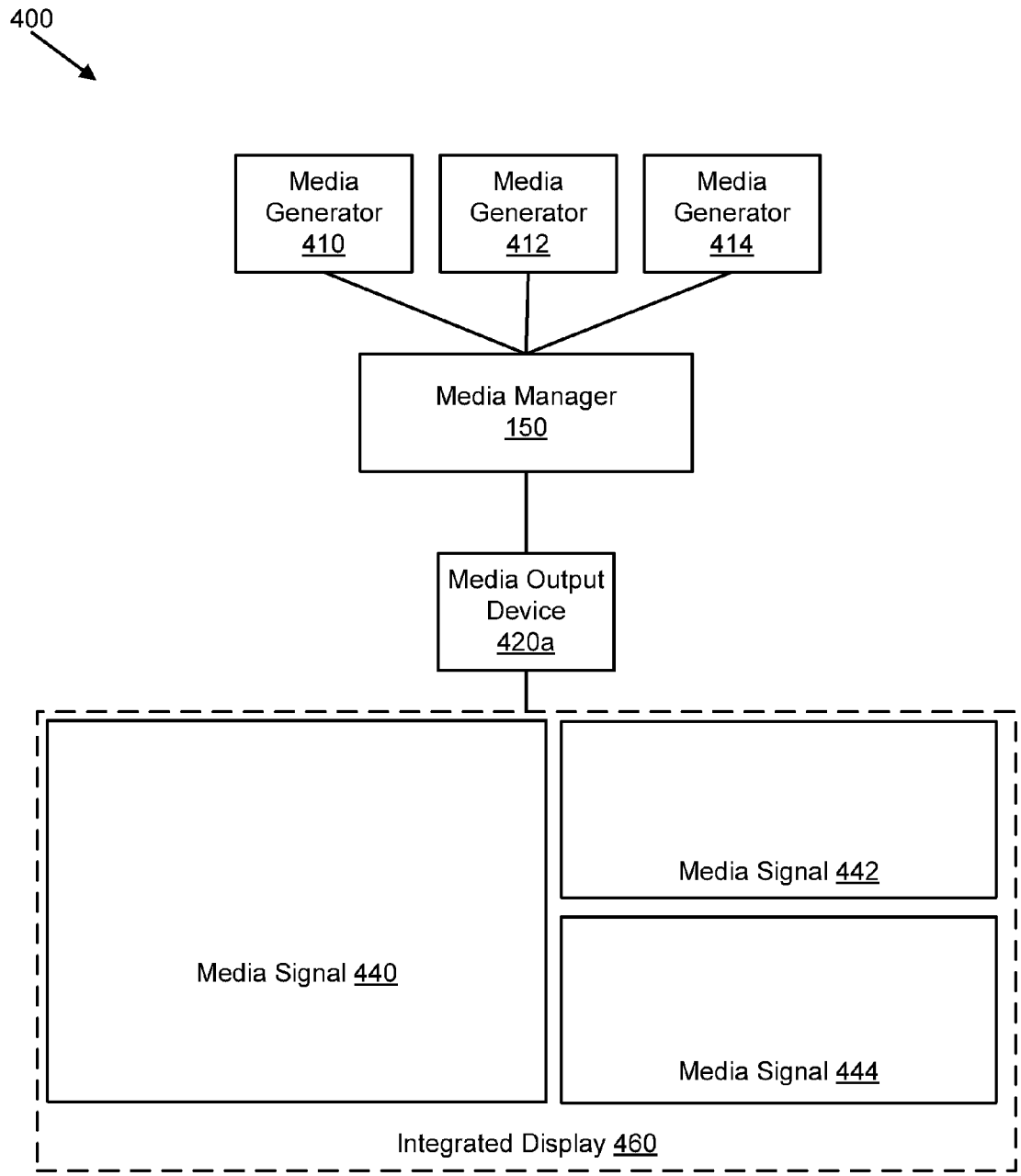
FIG. 4 is a schematic block diagram illustrating one embodiment of a system for cooperatively presenting three media signals via one media output.

FIG. 4 is a schematic block diagram illustrating one embodiment of a system for cooperatively presenting three media signals via one media output. In one embodiment, as previously described, media generators 410, 412, 414 may generate respective media signals 440, 442, 444. In this embodiment, the media signals 440,442,444 may be integrated into one integrated media signal and transmitted to a media output device 420a. The media output device 420a may cooperatively present the media signals 440,442,444 by presenting the integrated media signal via the integrated display 460.

In one example, the media signals 440, 442, 444 may be integrated such that media signal 440 is presented via the left half of the integrated display 460, media signal 442 may be presented via an upper portion of the right half of the integrated display, and the media signal 444 may be presented via a lower portion of the right half of the integrated display. One skilled in the art may recognize many other layouts of the media signals, or many other ways to integrate the media signals 440, 442, 444, and this disclosure is not limited in this regard. In another example, the media signal 440 may be presented via a left third of the integrated display 460, the media signal 442 may be presented via a middle third of the integrated display 460, and the media signal 444 may be presented via a right third of the integrated display 460.

Additionally, the media manager 150 may dynamically adjust the integrated portions of the media signals based, at least in part, on the media signals being received. For example, media generator 414 may initially not generate a media signal 444. In this example, the media manager 150 receives two media signals 440,442 from two media generators 410,412. The media manager 150 may integrate the two media signals such that the media signal 440 is presented via the left half of the integrated display, and the media signal 442 is presented via the right half of the integrated display.

Afterwards, the media manager 150 may receive another media signal 444 from the media generator 414. After receiving the new media signal 444 from the media generator 414, the media manager 150 may dynamically adjust the portions of the integrated display being used to present the media signals 440, 442, 444. In this example, the media manager 150 may move the media signal 442 from the right half of the integrated display 460 to the upper half of the right half of the integrated display 442 as depicted in FIG. 4. The media manager 150 may also integrated the media signal 444 into the integrated signal (the integrated signal now including three media signals 440, 442, 444) and present the media signal 444 via the lower half of the right half of the integrated display 460. As previously described, the media manager 150 may dynamically adjust the presented portions of the media signals.

The media manager 150 may receive configuration parameters for dynamically adjusting the integrated portions of the media signals and presented portions of the media signals. In one embodiment, the media manager 150 receives configuration parameters from a computing device. In one embodiment, the configuration parameters may identify media signals as to be presented, or to be ignored. For example, the configuration parameters may indicate that media signal 444 is not to be presented. In this example, the media manager 150 may receive the media signal 440, but may not dynamically alter the layout of the media signals via the integrated display 460.

In another embodiment, the configuration parameters may indicate a location where a media signal is to be presented via an integrated display. For example, as previously described, the media manager 150 may be configured such that a media signal 444 from a media generator 414 should be displayed in the bottom quarter of an integrated display 460. In this example, the media manager 150 may dynamically adjust the displayed media signals 440, 442, 444 in order to accommodate the configuration parameter. In another example, the configuration parameters may indicate that the media signal 440 from the media generator 410 should be displayed via the left half of the integrated display 460, as indicated in FIG. 4.

In another embodiment, the layout may be conditioned upon how many signals the media manager is currently receiving. For example, the configuration parameters may indicate then when receiving two media signals 410, 412, the media signals 410,412 should be presented side-by-side, or top to bottom, and when receiving three media signals 410, 412,414, the media signals should be presented in thirds of the integrated display, or as indicated in FIG. 4. Therefore, the media manager 150 may dynamically adjust the integrated portions, and the presented portions of the media signals 410,412,414 based on the media signals being received, or based on the configuration parameters.

In another embodiment, the configuration parameters may indicate priority levels for the media signals. For example, the configuration parameters may indicate that media signal 440, or other media signal from media generator 410 is a high priority media signal. Additionally, the configuration parameters may indicate that media signals 412,414 are low priority media signals. Therefore, based on the configuration parameters, the media manager 150 may integrated media signal 440 (a high priority signal in this example) to occupy the left half of the integrated display 460. Additionally, the media manager 150 may integrate media signals 412,414 (low priority signals in this example) to occupy upper and lower portions of the right half of the integrated display 460. In this example, the media signals that are lower priority are given less display area via the integrated display 460, and the media signal 410 that is a higher priority signal is given more display area via the integrated display 460.

Therefore, the media manager 150 may display the media signals 410,412, 414 as depicted in FIG. 4 based on the configuration parameters indicating priority levels for the media signals 410, 412, 414. The priority levels may be "highest", "very high," "high," "above normal," "normal," "below normal," "low," "very low," "lowest," or other, or the like. The priority levels may be assigned based on when the media manager 150 first receives the media signal, or other properties of the media signal, such as size, resolution, width, height, aspect ratio, frame rate, or the like. The priority may be assigned based on additional properties of the media signal, for example, the size of the video portion of a media signal, the volume of an audio portion of a media signal, the date or time when a media signal was generated, the genre of the media signal, or any combination, or the like. Additionally, in one embodiment, the priority levels may be numerical in value. For example, the priority levels may range from 0 to 100, 0 being the lowest priority and 100 being the highest priority. One skilled in the art will appreciate other ranges of priority levels that may be appropriate, or other terms that may be used based, at least in part, on the language being used, or the like.

In another embodiment, the configuration parameters may indicate that media signals 410,412,414 are to be integrated based on an order of when the media signals 410 were received. For example, the media manager 150 may receive media signal 440 before media signals 442, 444, and may then present the media signal 440 via the integrated display. Thereafter, the media manager 150 may receive media signal 412, and may dynamically adjust the presented media signals 440, 442 either side-by-side or top-to-bottom, or custom layout, or the like, as previously described. Thereafter, the media manager 150 may receive media signal 414 and may then dynamically adjust the presented media signals 440,442,444 as depicted in FIG. 4. Therefore, the media manager 150 may present the media signals 440,442, 444 as depicted in FIG. 4, based on the order when the media signals 410, 412, 414 were received.

In another embodiment, the media manager 150 may include any combination of the aforementioned configuration parameters. For example, the configuration parameters may indicate a layout based on an order of when the media signals are received, however, a high priority media signal, or the like, may be placed at the top of the order. Therefore, the media manager 150 may dynamically adjust the media signals 410, 412,414 based on both order and priority, or other, or the like.

In one embodiment, the media manager 150 may affect a media generator by reporting integration parameters. For example, a media manager 150 may report to a media generator that a media signal from the media generator is being displayed at a specific aspect ratio, resolution, or the like. In another embodiment, a media manager 150 may affect a media generator by commanding the media generator to alter a parameter of the media signal.

In one embodiment, the media manager 150 may command a media generator to alter or adjust the media signal being generated. In this embodiment, the media manager 150 may cause a media generator to transmit the media signal in a different resolution, aspect ratio, or format, or the like, based on the configuration parameters. For example, the media manager 150 may determine to present a media signal 444 in a small area of the integrated display 460. In this example, if media generator 414 is currently generating a high resolution media signal 444, the media manager 150 may affect, cause, or command the media generator 414 to generate a lower resolution media signal 444. The lower resolution media signal 444 may more efficiently be displayed in the smaller area of the integrated display 460. Another benefit may be to save transmission bandwidth by transmitting a lower resolution signal 444. Another benefit may be to adjust the aspect ratio of the media signal 444 so as to be more consistent with the available presentation area. In another example, the media manager 150 may command a media generator 414 to adjust the resolution of the media signal to be substantially similar to or to be an integral multiplier of an available presentation area. This may result in a clearer video portion of a media signal 444. In another example, the media manager 150 may command a media generator 414 to enhance the quality of the media signal when a larger presentation area is available via the integrated display 460.

In another embodiment the media manager 150 may manipulate a media generator to generate a different aspect ratio or resolution. For example, a media manager 150 may disconnect from a media generator, and then reconnect to a media generator. After reconnecting to the media generator, the media manager 150 may indicate an available aspect ratio or resolution to the media generator. In this example, the media manager 150 may provide extended display identification data (EDID) to a media generator. The media generator may then generate an efficient or compatible media signal for the available aspect ratio or resolution. In this way, a media manager 150 may modify or cause to be modified the aspect ratio or resolution of a media signal being generated by a media generator.

Figure 5:
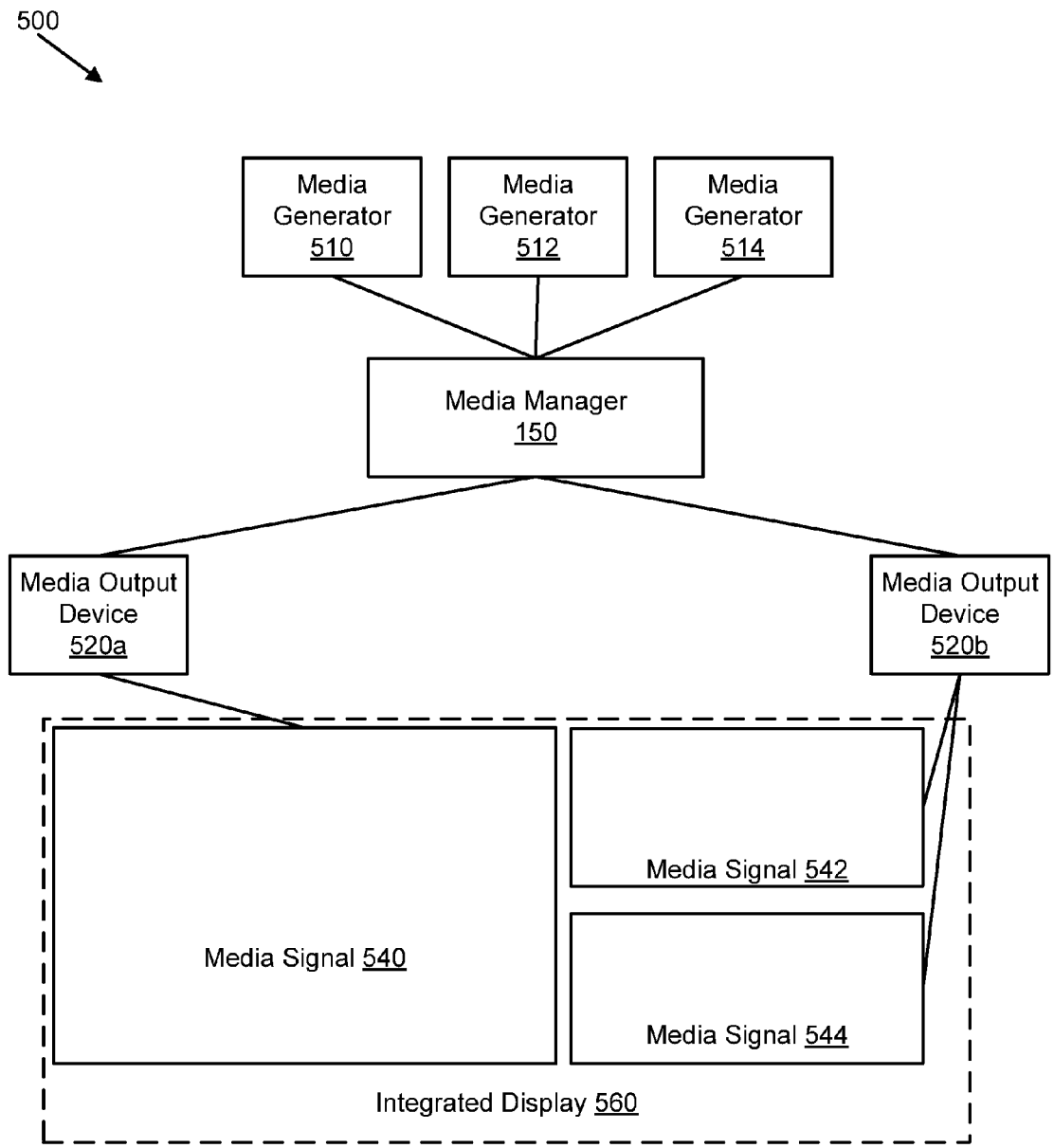
FIG. 5 is a schematic block diagram illustrating one embodiment of a system for cooperatively presenting three media signals via two media outputs.

FIG. 5 is a schematic block diagram illustrating one embodiment of a system for cooperatively presenting three media signals via two media outputs. In this embodiment, the ratio between media generators 510, 512, 514 and media output devices 520 is 3:2. In this embodiment, a media manager 150 receives three media signals 540, 542, 544. The media manager 150 transmits the media signal 540 to media output device 520a, and integrates media signals 542 and media signal 544 into an integrated signal for transmission to media output device 520b.

In another embodiment, the media manager 150 may receive updated configuration parameters and may then dynamically adjust the integrated or non-integrated portions of the media signals 540, 542, 544 based on the updated configuration parameters. For example, a media manager 150 may present two media signal 540 and media signal 542 side-by-side. The media manager 150 may then receive updated configuration parameters that may indicate that the media signals should be presented top-to-bottom. In this embodiment, the media manager 150 may dynamically adjust the presented media signals based on the updated configuration parameters, as previously described regarding the configuration parameters.

Regarding FIG. 5, in another example, media signal 542 and media signal 544 may be presented with media signal 544 presented on the top half of the right half of the integrated display 560, the media signal 542 being presented on the bottom half of the right half of the integrated display 560. The media manager 150 may receive updated configuration parameters indicating that media signal 542 should be on the top half of the right half of the integrated display 560, and the media signal 544 should be on the bottom half of the right half of the integrated display 560. The media manager 150 may then dynamically adjust the presented media signals 542,544 based on the updated configuration parameters by moving the media signal 542 to the top half of the right half of the integrated display, and moving the media signal 544 to the bottom half of the right half of the integrated display. The format indicated in FIG. 5 is only one of many possible formats, and this disclosure is not limited in this regard. One skilled in the art would appreciate a wide variety of different formats.

Figure 6:
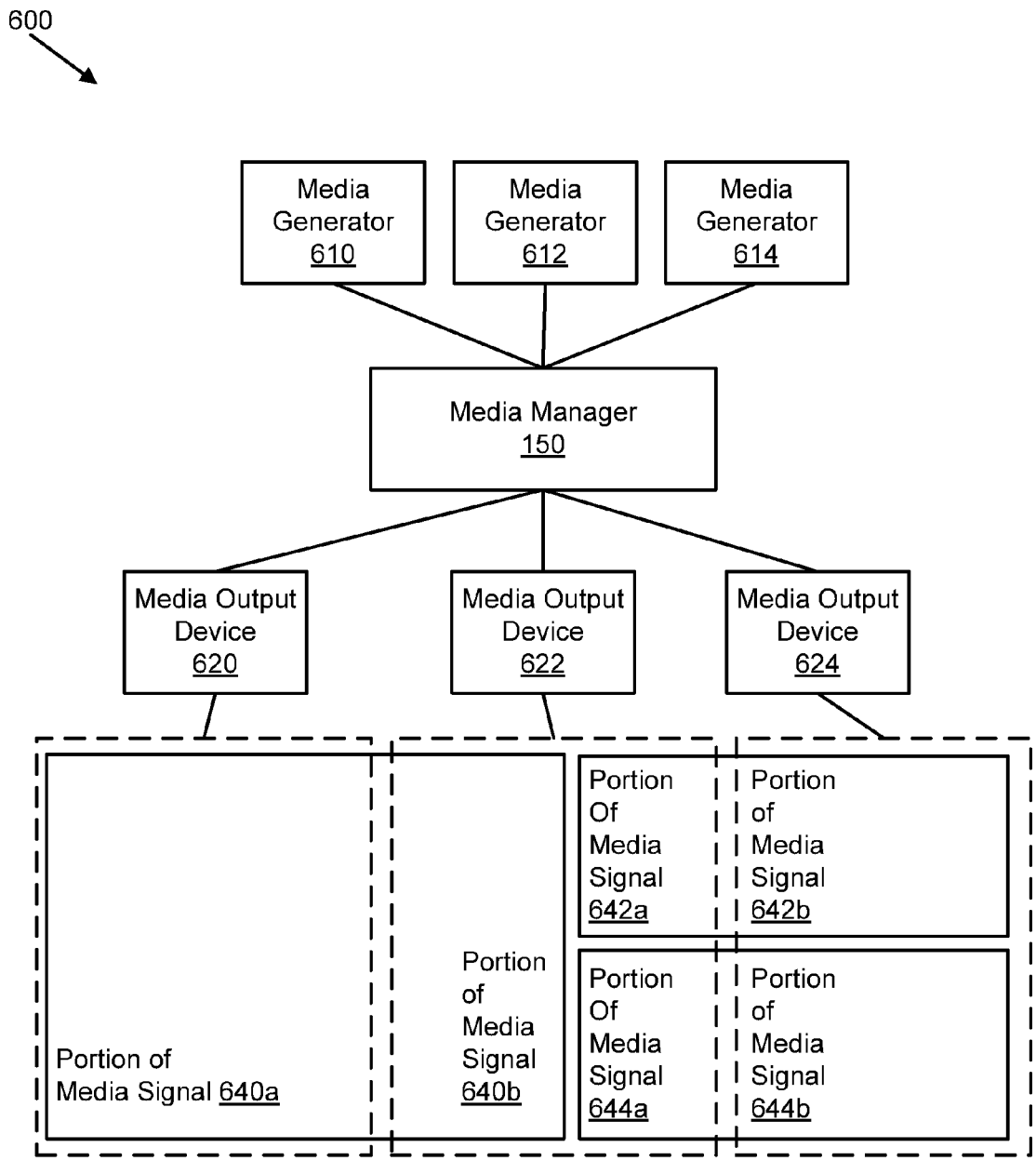
FIG. 6 is a schematic block diagram illustrating one embodiment of a system for cooperatively presenting three media signals via three media outputs.

FIG. 6 is a schematic block diagram illustrating one embodiment of a system for cooperatively presenting three media signals via three media outputs. In this embodiment, although there are three media generators 610, 612, 614 and three media output devices 620, 622, 624, the media signals 640, 642, and 644 do not necessarily correlate to specific media output devices 620, 622, 624. As depicted in FIG. 6, and as previously described, the media manager 150 may receive media signals 640, 642, 644 from media generators 610, 612, 614. In this embodiment, the media signals 640, 642, 644 are split between media output devices 620, 622, 624.

For example, as depicted in FIG. 6, a portion 640a of media signal 640 may be transmitted to media output device 620 for presentation. The media manager 150 may integrate a portion 642a of media signal 642 and a portion 644a of media signal 644 with the remaining portion 640b of media signal 640. Therefore, the media manager 150 may cooperatively present portions 640b, 642a, 644a of the media signals via the media output device 622. Also, in this example, the media manager 150 may present remaining portions 642b, 644b of media signals 642,644 (portions of the media signals 642, 644 that are not yet being presented) via the media output device 624. Therefore, in this embodiment, although there are three media generators 610, 612, 614, and three media output devices 620, 622, 624, the corresponding media signals 640, 642, 644, do not necessarily correspond to media output devices 620, 622, 624. Additionally, as previously described, the media manager 150 may receive updated configuration parameters, and may dynamically adjust the integrated portions of the media signals and the presented portions of the media signals.

Figure 7:
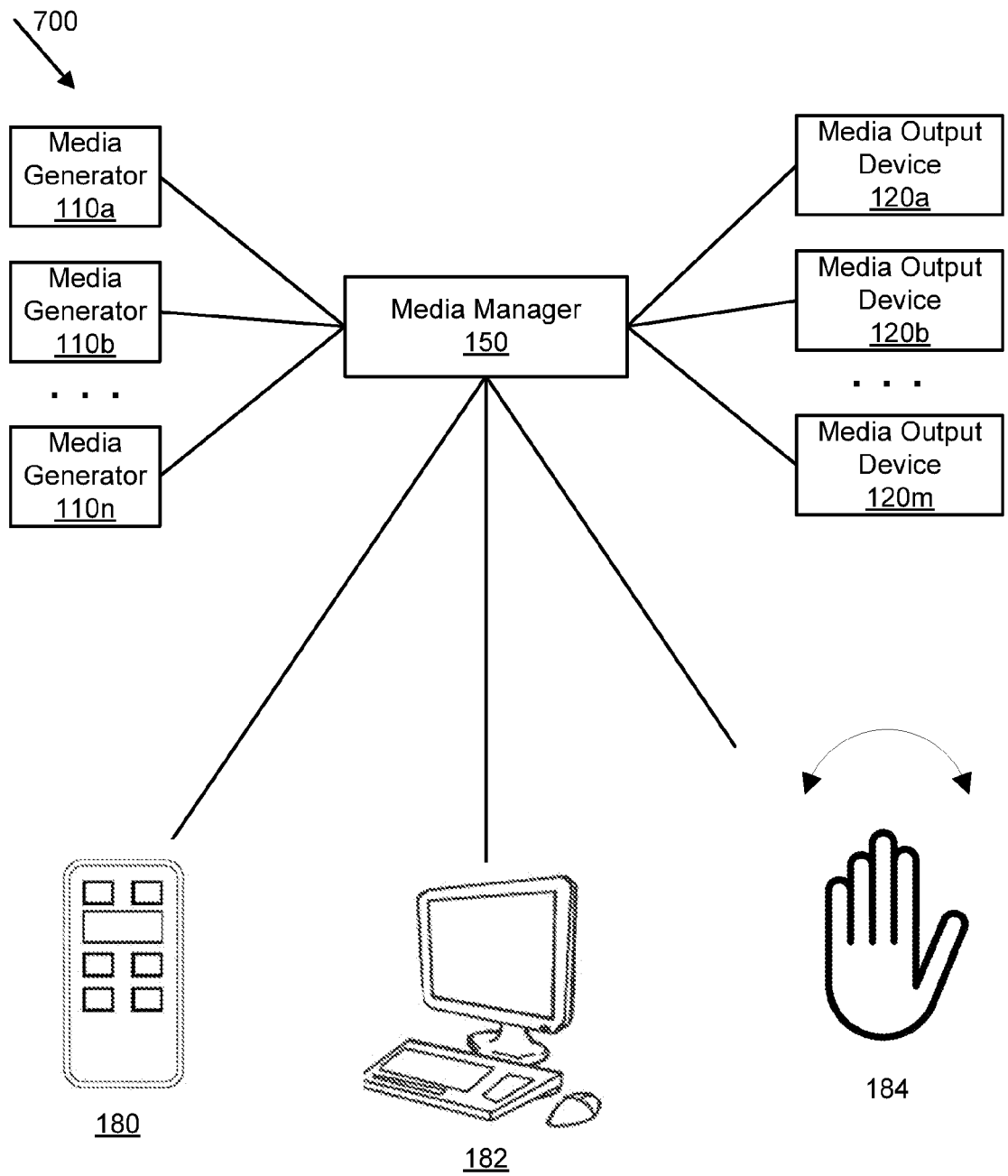
FIG. 7 is a schematic block diagram illustrating one embodiment of a system for cooperatively presenting multiple media signals via multiple media outputs.

FIG. 7 is a schematic block diagram illustrating one embodiment of a system for cooperatively presenting multiple media signals via multiple media outputs. In this embodiment, media generators 110a through 110n (n indicating an integer value higher than two), generate media signals as previously described. The media manager 150 integrates the media signals and cooperatively presents the integrated media signals via the media output devices 120a through 120m (m indicating an integer value higher than two). In this embodiment the 'n' and the 'm' may or may not represent the same value. Therefore, they may or may not be the same number of media generators 110 as there are media output devices 120.

In this embodiment, the media manager 150 receives configuration parameters for dynamically adjusting the integrated portions of the media signals and the presented portions of the media signals. For example, the media manager 150 may receive configuration parameters from a remote control device. In another example, the media manager 150 may receive configuration parameters from a computing device, such as a personal computer, mobile computer, other computing device, or the like. In another example, the media manager 150 may receive configuration parameters from a gesture sensing device. In another embodiment, the media manager 150 may interpret received signals from a remote controller, a computing device, a gesture, or the like, and may convert the signals to configuration parameters. Therefore, in the case of a gesture sensing capability, the signal may be a light signal indicating a pattern of movement as one skilled in the art of gesture sensing would appreciate.

In this example, the media manager may sense an open hand for targeting a portion of a media signal being presented by a media output device. The media manager may sense a closed first for selecting the targeted presented portion of a media signal. After a portion of a media signal is selected, the media manager may sense a hand moving to indicate that the selected portion of the media signal being displayed should be moved to another location. The media manager may then sense the hand opening to indicate that the selected portion of the media signal can be moved to another targeted location. In another example, the media manager 150 may sense two hands moving closer towards each other to indicate that a displayed portion of a media signal is to be resized to a smaller size. In another example, the media manager 150 may detect or sense two hands moving further apart from each other to indicate that a displayed portion of a media signal should be expanded to a larger size. Configuration parameters may map gestures to commands to modify the integrated portions and the presented portions of the media signals.

Figure 8:
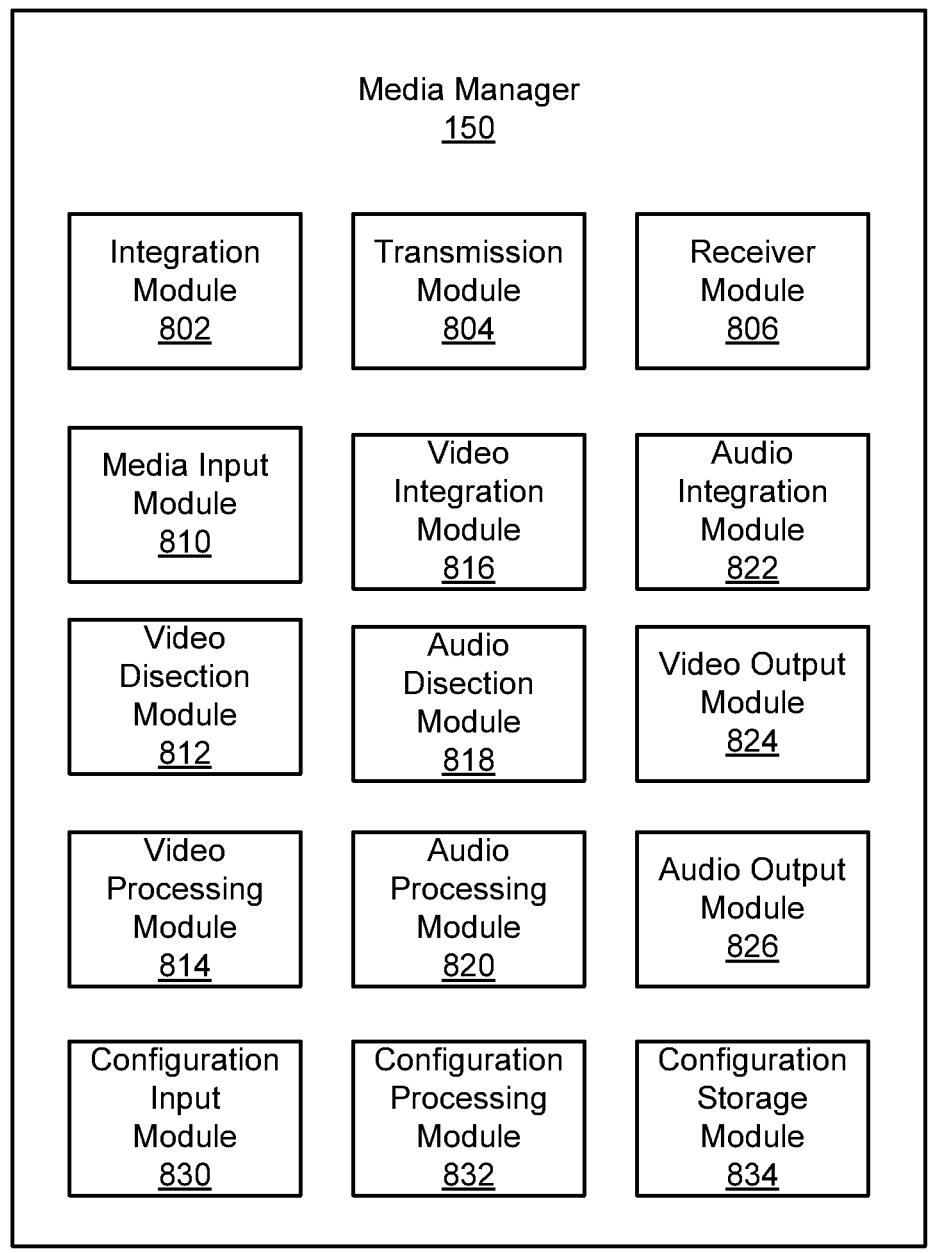
FIG. 8 is a schematic block diagram illustrating one embodiment of a system for cooperatively presenting multiple media signals via multiple media outputs.

FIG. 8 is a schematic block diagram illustrating one embodiment of a system for cooperatively presenting multiple media signals via multiple media outputs. The system includes several modules including: an integration module 802, a transmission module 804, a receiver module 806, a media input module 810, a video dissection module 812, a video processing module 814, a video integration module 816, an audio dissection module 818, an audio processing module 820, an audio integration module 822, a video output module 824, an audio output module 826, a configuration input module 830, a configuration processing module 832, and a configuration storage module 834.

The integration module 802 may perform similar functions as the media manager 150, the video dissection module 812, the video processing module 814, the video integration module 816, the audio integration module 822, the audio dissection module, or the audio processing module 820. The transmission module 804 may also perform similar functions as the media manager 150, the video output module 824, or the audio output module 826. The receiver module 806 may also perform similar function as the media manager 150, the configuration input module 830, the configuration processing module 832, or the configuration storage module.

The media input module 810 may perform similar functions as the integration module 802. In one embodiment, the media input module 810, in one embodiment may receive a media signal. The received media signal may be compressed and the media input module 810 may decompress the media signal. In one example, the received media signal may be encrypted and the media input module may decrypt the media signal. The media signal may include a video portion, and an audio portion. The media input module 810 may be in any of the media formats previously described, or other, or to be developed formats, or the like. The connection to a device capable of generating a media signal may also be any of the previously indicated connection technologies.

The video dissection module 812 may perform similar functions as the integration module 802. In one embodiment, the video dissection module 812 may remove an audio portion of a media signal such that the media signal includes only video. In another embodiment, the video dissection module 812 may divide the media signal into several horizontal portions. In another embodiment, the video dissection module 812 may divide the media signal into multiple vertical portions. In one embodiment, the video dissection module 812 may select a window view for a portion of the media signal thereby removing another portion of the media signal outside of the selected window.

The video processing module 814 may perform similar functions as the integration module 802. In one embodiment, the video processing module 814 may adjust settings of a media signal. For example, the video processing module 814 may increase or decrease the brightness of a media signal. In another example, the video processing module 814 may resample the media signal at a different frame rate, or at a different bit-rate. In another example, the video processing module 814 may alter the aspect ratio or resolution of the media signal, flatten the media signal, expand the media signal, grow the video signal, shrink the video signal, or other, or the like. In another example, the video processing module 814 may increase or decrease the resulting play speed of the media signal by altering the frame rate of the media signal without resampling the media signal.

In another embodiment, the video processing module 814 may create visual effects over time. For example, the video processing module 814 may grow a media signal to gradually introduce the media signal to an integrated display. In another example, the video processing module 814 may gradually shrink a media signal in order to remove the media signal from an integrated display. In another embodiment, the video processing module may add or remove media signals from an integrated display and dynamically adjust the other media signals. For example, if a media signal was removed from an integrated display, the video processing module may adjust the area usage of the remaining media signals. In another example, the video processing module 814 may add a media signal to an integrated display, and may dynamically reduce the area usage of previous media signals in order to make space on an integrated display for the media signal to be added. In another embodiment, the video processing module 814 may compress or decompress a media signal.

The video integration module 816 may perform similar functions as the integration module 802. In one embodiment, the video integration module 816 may combine more than one media signal. For example, combined media signals may be side-by-side, top-to-bottom, picture-in-picture, or other, or the like. In another embodiment, the video integration module may place media signals, or portions of media signals into different areas of a frame buffer of a video output module 824.

The audio dissection module 816 may perform similar functions as the integration module 802. In one embodiment, the audio dissection module 818 may remove a video portion of a media signal such that the media signal is substantially audio. In another embodiment, the audio dissection module 816 may remove audio portions of the media signal based on time indexes, volume (magnitude), frequency, or the like. For example, an audio dissection module may apply a band pass filter to remove frequencies from the media signal, or allow specified frequencies. The band pass filter may be a high pass or a low pass filter, or other, or the like.

The audio processing module 820 may perform similar functions as the integration module 802. In one embodiment, the audio processing module 820 may combine media signals. For example, the audio processing module 820 may assemble media signals sequentially. In another example, the audio processing module 820 may combine media signals such that they may play at substantially the same time. In another embodiment, the audio processing module may resample the media signal at an alternate frequency, or perform other audio signal manipulation techniques as one skilled in the art would appreciate.

The audio integration module 822 may perform similar functions as the integration module 802. In one embodiment, the audio integration module 822 may combine media signals that include audio signals. For example, the audio integration module 822 may combine multiple media signals sequentially. In another example, the audio integration module may combine the media signals such that the media signals are presented at substantially the same time.

The video output module 824 may perform similar functions as the transmission module 804. In one embodiment, the video output module 824 may output media signals to media output devices. In one example, the video output module 824 may output a media signal to multiple media output devices. In another example, the video output module 824 may output multiple media signals to multiple media output devices. In one embodiment, the video output module 824 may include a frame buffer for each interface to a media output device. The video integration module 816, or other module may write video data to the frame buffer.

The audio output module 826 may perform similar functions as the transmission module 804. In one embodiment, the audio output module 826 may perform similar functions as the video output module 824. In one embodiment, the audio output module 826 may include an audio buffer. An audio output module may receive multiple media signals and transmit the received media signals to one media output device. In another embodiment, the audio output module 826 may transmit different portions of media signals to different media output devices.

The configuration input module 830 may perform similar functions as the receiver module 806. In one embodiment, the configuration input module 830 may receive configuration parameters from a variety of different devices as previously described. The configuration input module 830 may receive configuration parameters from multiple input devices at substantially the same time, or at different times. In one embodiment, the configuration input module 830 may be configured to associate configuration parameters with signals received from input devices. For example, the configuration input module 830 may be configured to associate gesture like a closed first to mean that a targeted media signal should be removed from an integrated display. In this example, the configuration input module 830 may be updated with a new association between a gesture and a configuration parameter.

In another embodiment, the configuration input module 830 may interpret received commands as temporary commands. For example, the configuration input module 830 may associate gestures with users of the media manager 150. In this example, the configuration input module 830 may interpret gestures from one user as permanent configuration parameters (are valid until changed). In another example, the configuration input module 830 may interpret gestures from another user as temporary configuration parameters, the temporary parameters being valid for an amount of time.

The configuration processing module 832 may perform similar functions as the receiver module 806. In one embodiment, the configuration processing module 832 may analyze the configuration parameters and may alter of adjust incompatible configuration parameters. In another embodiment, the configuration processing module 832 may reject configuration updates based on conditions such as impossibility, incompatibility, safety, content ratings, or other, or the like. The configuration processing module 832 may be configured to update temporary configuration parameters, and may remove the updated temporary configuration parameters after an amount of time, thereby restoring more permanent configuration parameters. In another embodiment, the configuration processing module 832 may autocorrect configuration parameters based on any of the aforementioned conditions.

In another embodiment, the configuration processing module may store multiple sets of configuration parameters. For example, the configuration processing module 832 may store a set A and a set B of configuration parameters. In this example, set A parameters may be valid for weekdays and set B parameters may be used for weekends. Additionally, other sets may be used for other times or dates.

The configuration storage module 834 may perform similar functions as the receiver module 806. In one embodiment, the configuration storage module 834 may store configuration parameters in volatile memory, or in a non-volatile storage device, such as flash memory, hard disk memory, or other, or the like. The configuration storage module 834 may allow configuration parameters to be overwritten, or many deny configuration parameters when there is already an existing parameter for the one being stored. The configuration storage module 834 may, in one embodiment, store a backup copy of configuration parameters, and may restore many sets of configuration parameters. In this example, the different sets of configuration parameters may be valid or used by the media manager 150 at different times or dates as previously described.

Figure 9:
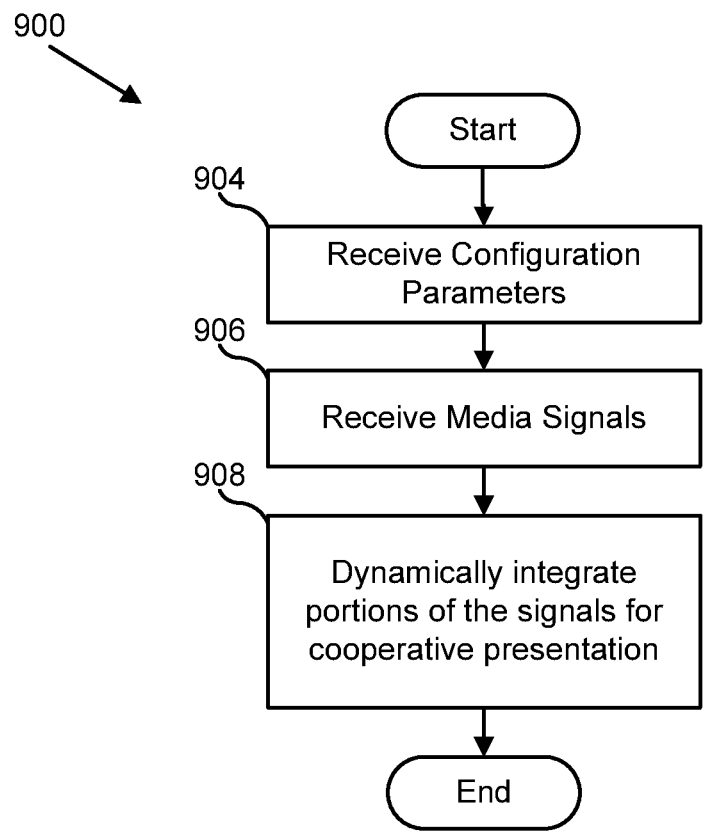
FIG. 9 is a schematic flow chart diagram illustrating one embodiment of a method for cooperatively presenting multiple media signals via multiple media outputs.

FIG. 9 is a schematic flow chart diagram illustrating one embodiment 900 of a method for cooperatively presenting multiple media signals via multiple media outputs. In this embodiment, the media manager 150 receives 904 configuration parameters. The media manager 150 then receives 906 one or more media signals. The media manager then dynamically integrates 908 the media signals for cooperative presentation as previously described.

Figure 10:
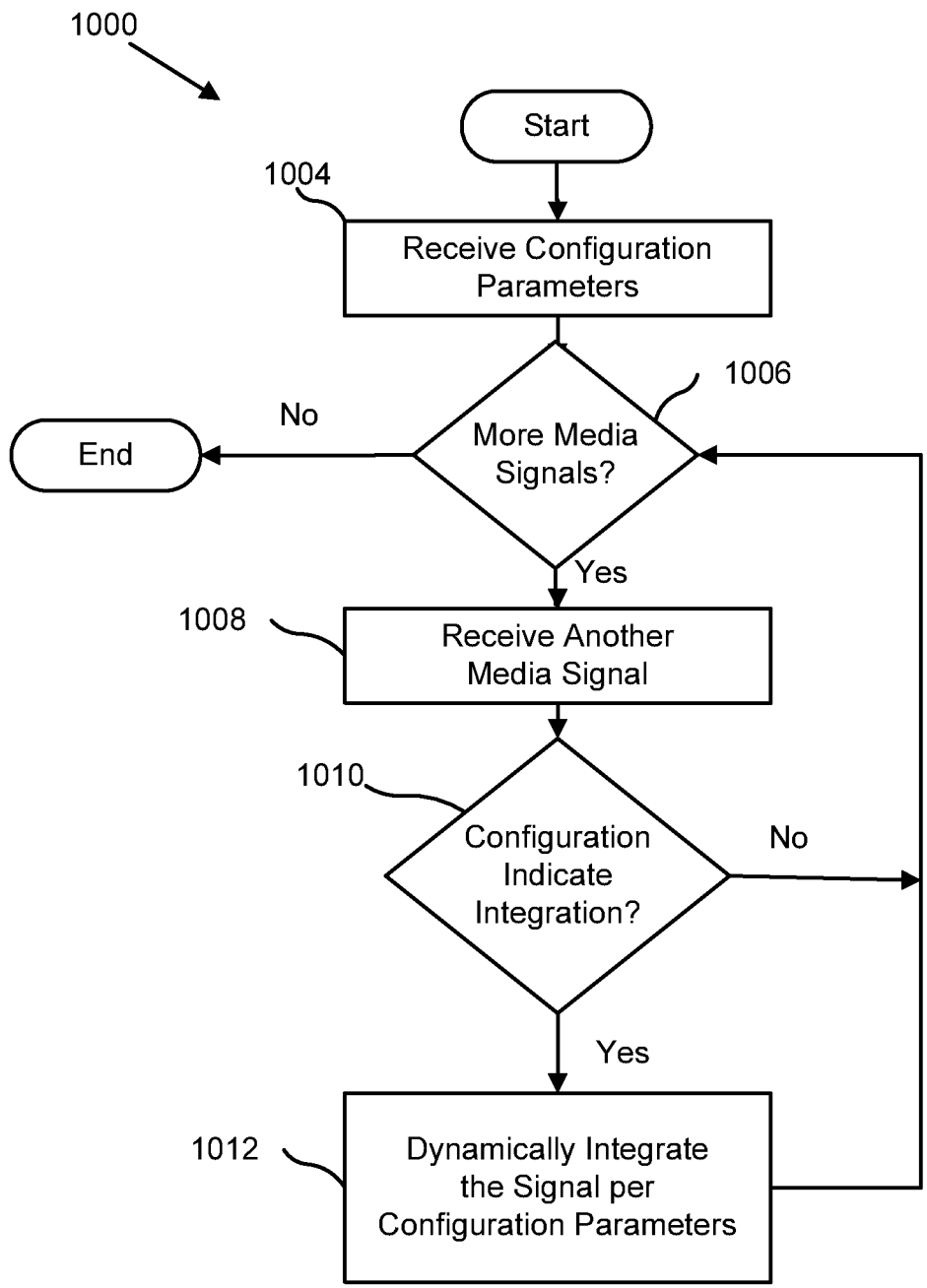
FIG. 10 is another schematic flow chart diagram illustrating one embodiment of a method for cooperatively presenting multiple media signals via multiple media outputs.

FIG. 10 is another schematic flow chart diagram illustrating one embodiment 1000 of a method for cooperatively presenting multiple media signals via multiple media outputs. In this embodiment, the media manager 150 receives 1004 configuration parameters as previously described. After configuration parameters are received 1004, the media manager checks 1006 for the presence of media signals. If there is another media signal not being received by the media manager 150, the media manager 150 receives 1008 the media signal. The media manager 150 then determines 1010 if the new received media signal is to be integrated into a media signal for cooperative presentation, based, at least in part, on the configuration parameters. If the configuration parameters indicate that the new media signal is to be integrated, the media manager 150 dynamically integrates 1012 the new signal. The method then continues at block 1006 where the media manager 150 may check for more media signals. If the configuration parameters indicate that the new media signal is not to be integrated, the media manager 150 may ignore the new media signal and continue at block 1006 by looking for more media signals. If there are no more available media signals 1006, the method ends.

Figure 11:
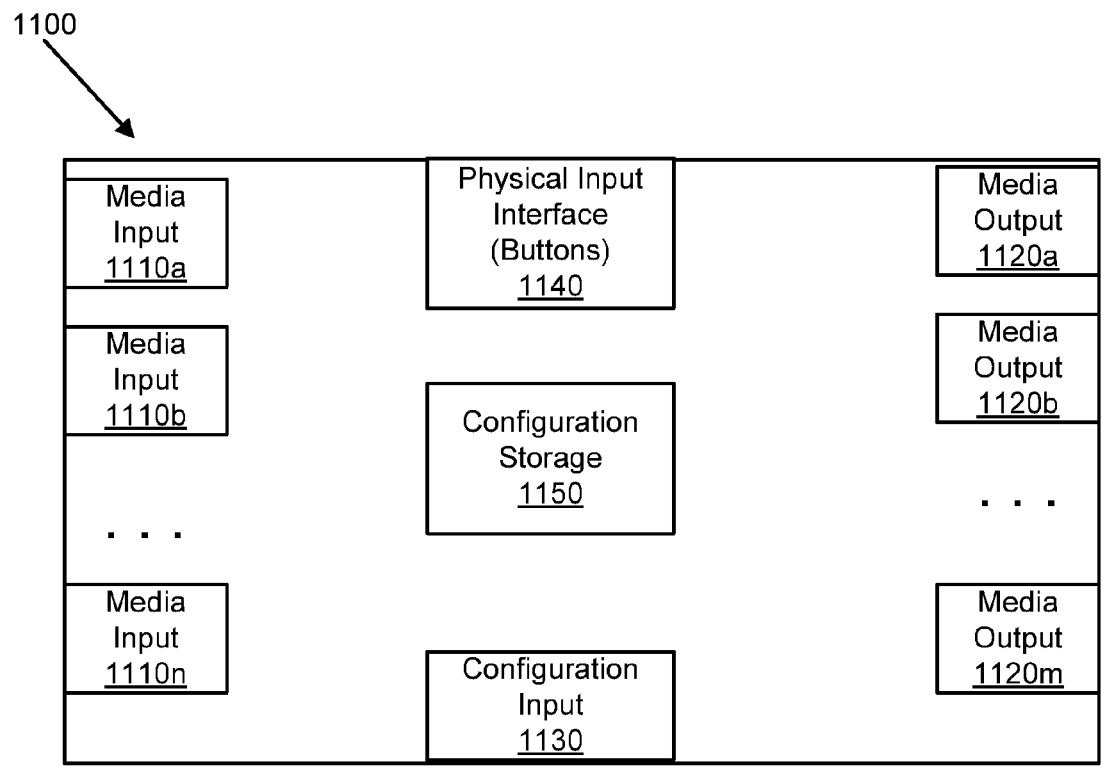
FIG. 11 is one embodiment of an apparatus for cooperatively presenting multiple media signals via multiple media outputs.

FIG. 11 is one embodiment 1100 of an apparatus for cooperatively presenting multiple media signals via multiple media outputs. In this embodiment, the apparatus 1100 includes an integration module 802, a transmission module 804, and a receiver module 806. The integration module 802 includes multiple media input interfaces 1110 (n indicating the number of input interfaces). The receiver module includes physical interface buttons 1140, a configuration storage module 1150, a configuration input module 1130. The transmission module includes multiple media output interfaces (interfaces to media output devices) 1120. In this embodiment 1100, the input interfaces may be capable of receiving the various formats of media signals as previously described. the media inputs may receive the media signals via a wired, or a wireless connection. The apparatus 1100 may include physical buttons for providing configuration parameters to the apparatus 1100. The apparatus 1100 may also include a configuration storage module 1150 as previously described. The apparatus 1100 may also include a configuration input module 1130 as previously described. The apparatus 1100 may also include multiple media outputs 1120 for transmitting integrated media signals to media output devices. Connections to media output devices may be via a wired connection, or may occur wirelessly according to a wide variety of wireless transmission protocols, as one skilled in the art would appreciate.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a memory storing machine readable code; and
a processor executing the machine readable code, the machine readable code comprising a media manager, the media manager comprising:
an integration module for integrating one or more portions of a first media signal and a second media signal into an integrated media signal for presentation via one or more media outputs, wherein a media signal comprises an audio portion and a video portion;
a transmission module for cooperatively transmitting the integrated media signal to the one or more of media outputs, each media output receiving a portion of the integrated media signal, wherein different media outputs receive different portions of the integrated media signal; and
a receiver module for receiving configuration parameters for dynamically adjusting integrated portions of the first and second media signals and transmitted portions of the first and second media signals, wherein dynamically adjusting the integrated portions of the first and second media signals comprises excluding the audio portion of one or more of the first and second media signals from the integrated media signal; and
dynamically adjusting the transmitted portions of the first and second media signals comprises determining a layout of the transmitted portions of the first and second media signals on a display.

2. The apparatus of claim 1 wherein the first and second media signals originate from different media devices.

3. The apparatus of claim 2 wherein
the first and second media signals comprise signals originating from a television device and a gaming console; and
the transmission module cooperatively transmits the integrated media signal to one media output.

4. The apparatus of claim 1 wherein the receiver module receives configuration parameters via one of a USB connection, an Ethernet connection, a wireless connection, and a connection with a gesture motion sensor.

5. The apparatus of claim 1 wherein determining a layout of the transmitted portions of the first and second media signals on a display comprises displaying each media signal based on the order in which the media manager received the media signal.

6. The apparatus of claim 1 wherein determining a layout of the transmitted portions of the first and second media signals on a display comprises displaying each media signal based on the priority assigned to the media signal.

7. The apparatus of claim 1 wherein dynamically adjusting the integrated portions of the first and second media signals comprises integrating a portion of a third media signal into the integrated media signal.

8. The apparatus of claim 1 wherein one or more of the first and second media signals are encrypted.

9. The apparatus of claim 1 wherein there is a one-to-one correlation between the media signals and the media outputs.

10. The apparatus of claim 1 wherein media signals are received via one of HDMI, DisplayPort, RGB video with dual channel audio, Miracast®, and WiGig® WDE.

11. A method comprising:
receiving a plurality of configuration parameters for determining how a plurality of media signals are presented via one or more media outputs, wherein a media signal comprises an audio portion and a video portion;
receiving a first media signal and a second media signal;
dynamically integrating one or more portions of the first and second media signals into an integrated media signal for cooperative presentation via the one or more media outputs and based on the configuration parameters, the configuration parameters excluding the audio portion of one or more of the first and second media signals from the integrated media signal and determining a layout of each media signal relative to the other media signals on a display.

12. The method of claim 11, wherein the first and second media signals originate from different media devices.

13. The method of claim 11 wherein integrating one or more portions of the first and second media signals comprises combining a media signal from a television device and a media signal from a gaming console into one side-by-side integrated media signal.

14. The method of claim 11 wherein the cooperative presentation comprises dividing the integrated media signal into one or more portions, and transmitting respective portions to different media outputs.

15. The method of claim 11, further comprising:
receiving a third media signal; and
dynamically adjusting the integrated media signal to integrate a portion of the third media signal.

16. The method of claim 15 wherein adjusting the integrated media signal comprises overlaying a portion of the third media signal onto a portion of one of the first and second media signals and muting an audio portion of the third media signal.

17. The method of claim 15 wherein adjusting the integrated media signal comprises modifying the integrated media signal to additionally include the third signal in a format selected from the group: side-by-side, top-bottom, and picture-in-picture.

18. The method of claim 15, further comprising:
before adjusting the one or more media outputs,
receiving additional configuration parameters via communication with a body gesture sensor, wherein the adjusting is based on the additional configuration parameters.

19. A program product comprising a non-transitory computer readable storage medium storing machine readable code executable by a processor to perform the operations of:

receiving a plurality of configuration parameters for determining how a plurality of media signals are presented via one or more media outputs, wherein a media signal comprises an audio portion and a video portion;

receiving a first media signal and a second media signal; and dynamically integrating one or more portions of the first and second media signals into an integrated media signal for cooperative presentation via the one or more media outputs and based on the configuration parameters, the configuration parameters excluding the audio portion of one or more of the first and second media signals from the integrated media signal and determining a layout of each media signal relative to the other media signals on a display.

20. The program product of claim 19, further comprising receiving a third media signal, and adjusting one or more integrated media signals dynamically to integrate a portion of the third signal.

21. A system comprising:
a plurality of media devices for generating a plurality of respective media signals;
a plurality of media output devices for cooperatively presenting integrated portions of the media signals; and
a media manager comprising:
an integration module for integrating portions of a plurality of the respective media signals to generate one or more integrated media signals, wherein a media signal comprises an audio portion and a video portion;
a transmission module for transmitting portions of the one or more integrated media signals to the plurality of media outputs; and
a receiver module for receiving configuration parameters to dynamically adjust integrated portions and transmitted portions of the media signals, wherein
dynamically adjusting the integrated portions of the media signals comprises excluding the audio portion of one or more of the media signals from the one or more integrated media signals; and
dynamically adjusting the transmitted portions of the media signals comprises determining a layout of the transmitted portions of the media signals on a display.

* * * * *